(12) United States Patent
Savir et al.

(10) Patent No.: US 10,104,003 B1
(45) Date of Patent: Oct. 16, 2018

(54) METHOD AND APPARATUS FOR PACKET PROCESSING

(71) Applicant: MARVELL ISRAEL (M.I.S.L) LTD., Yokneam (IL)

(72) Inventors: Shai Savir, Ramat Hasharon (IL); Idan Rozenberg, Tel Aviv (IL); Eran Blich, Kefar Saba (IL)

(73) Assignee: MARVELL ISRAEL (M.I.S.L) LTD., Yokneam (IL)

( * ) Notice: Subject to any disclaimer, the term of this patent is extended or adjusted under 35 U.S.C. 154(b) by 299 days.

(21) Appl. No.: 15/185,854

(22) Filed: Jun. 17, 2016

Related U.S. Application Data

(60) Provisional application No. 62/181,319, filed on Jun. 18, 2015.

(51) Int. Cl.
*H04L 12/28* (2006.01)
*H04L 12/801* (2013.01)
*H04L 12/761* (2013.01)
*H04L 12/26* (2006.01)

(52) U.S. Cl.
CPC .............. *H04L 47/34* (2013.01); *H04L 43/16* (2013.01); *H04L 45/16* (2013.01)

(58) Field of Classification Search
CPC ....................................................... H04L 47/37
USPC .......................................................... 370/394
See application file for complete search history.

(56) References Cited

U.S. PATENT DOCUMENTS

| 7,089,293 | B2* | 8/2006 | Grosner | H04L 29/06 370/364 |
| 9,276,868 | B2 | 3/2016 | Shumsky et al. | |
| 9,432,298 | B1* | 8/2016 | Smith | H04L 49/9057 |
| 2007/0230493 | A1* | 10/2007 | Dravida | H04L 47/14 370/412 |
| 2009/0240874 | A1* | 9/2009 | Pong | G06F 12/0223 711/105 |
| 2012/0281536 | A1* | 11/2012 | Gell | H04W 28/06 370/235 |
| 2012/0327779 | A1* | 12/2012 | Gell | H04L 47/2475 370/238 |

* cited by examiner

Primary Examiner — Shripal Khajuria

(57) ABSTRACT

Aspects of the disclosure provide a method for packet processing. The method includes receiving a plurality of packets at a port of a network device. The plurality of packets belong to a packet flow having a sequence within a stream of packets. The method then includes mapping identifications respectively allocated to the plurality of packets into a data structure of ordered identifications to maintain the sequence, and generating a new packet instance during processing of a specific packet. The specific packet has a specific identification and is one of the plurality of the packets. Then, the method includes inserting a new identification allocated to the new packet instance into the data structure of ordered identifications next to the specific identification to maintain the sequence and transmitting the plurality of packets and the new packet instance from the network device according to the sequence maintained in the data structure.

20 Claims, 6 Drawing Sheets

```
typedef int packet[];
typedef struct ethernet {
    int sid;
    int num_of_duplications;
    .
    .
    .
    packet info;
} frame;
function process_duplication_of_packets {
    frame *received_frame;
    while (1) {
        wait_for_event(event);                          ← 610
        get_frame_from_port(received_frame);            ← 615
        classify_frame(received_frame);                 ← 620
        while(received_frame.num_of_duplications>1){    ← 625
            process_frame(received_frame);              ← 630
            send_frame_to_port(received_frame);         ← 635
            next_sid = add_sid(received_frame.sid);     ← 640
            received_frame.sid = next_sid;              ← 645
            received_frame.num_of_duplications--;       ← 650
        }
        process_frame(received_frame);                  ← 655
        send_frame_to_port(received_frame);             ← 660
    }
}
```

METHOD AND APPARATUS FOR PACKET PROCESSING

INCORPORATION BY REFERENCE

This present disclosure claims the benefit of U.S. Provisional Application No. 62/181,319, "NSS REORDER UNIT" filed on Jun. 18, 2015, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Some network devices, such as network switches, routers, edge devices and the like include multiple processing elements to process different packets in a stream of packets in parallel in order to achieve relatively high bandwidth. In such network devices, it is important to utilize the processing elements to concurrently perform parallel processing of packets belonging to a data flow while maintaining an order of packets within the data flow.

SUMMARY

Aspects of the disclosure provide a method for packet processing to improve network efficiency for processing fragmentation, multicasting and the like. The method includes receiving a plurality of packets at a port of a network device. The plurality of packets belong to a packet flow having a sequence within a stream of packets. The method then includes mapping identifications respectively allocated to the plurality of packets into a data structure of ordered identifications to maintain the sequence of the packet flow, and generating a new packet instance during processing of a specific packet. The new packet instance is a portion of the specific packet or a replica of the specific packet. The specific packet has a specific identification and is one of the plurality of the packets. Then, the method includes inserting a new identification allocated to the new packet instance into the data structure of ordered identifications next to the specific identification to maintain the sequence of the packet flow and transmitting the plurality of packets and the new packet instance belonging to the packet flow from the network device according to the sequence of the packet flow maintained in the data structure.

To map the identifications respectively allocated to the plurality of packets into the data structure of ordered identifications to maintain the sequence of the packet flow, the method includes mapping the identifications respectively allocated to the plurality of packets into a linked list of ordered identifications to maintain the sequence of the packet flow.

To generate the new packet instance during processing of the specific packet, in an example, the method includes generating the new packet instance that is the replica of the specific packet in response to a multicast of the specific packet. In another example, the method includes generating the new packet instance that is a fragment packet of the specific packet when a size of the specific packet is larger than a threshold.

To insert the new identification allocated to the new packet instance into the data structure of ordered identifications next to the specific identification to maintain the sequence of the packet flow, in an example, the method includes inserting the identification allocated to the new packet instance into the data structure of ordered identifications after the specific identification for the specific packet. In another example, the method includes inserting the identification allocated to the new packet into the data structure of ordered identifications before the specific identification for the specific packet.

Further, in an example, the method includes distributing the packets among two or more packet processing elements for a run-to-complete type of packet processing.

In an embodiment, to transmit the plurality of packets and the new packet instance from the network device according to the sequence of the packet flow maintained in the data structure, the method includes transmitting the specific packet and the new packet instance out the network device without halting a packet processing element to check whether the specific identification is at a head position of the data structure.

In an embodiment, the method also includes finishing packet processing of the specific packet by a packet processing element without checking whether the specific identification for the specific packet is at a head position of the data structure.

Aspects of the disclosure provide a circuit that includes a plurality of ports, a plurality of packet processing elements, and a reorder unit. The plurality of ports is configured to receive and transmit packets on a network. The plurality of packet processing elements configured to process packets received from the ports. The reorder unit is configured to map identifications respectively allocated to a plurality of packets belonging to a packet flow having a sequence within a stream of packets into a data structure of ordered identifications to maintain the sequence of the packet flow, and allocate a new identification to a new packet instance generated during processing of a specific packet. The new packet instance is a portion of the specific packet or a replica of the specific packet, the specific packet has a specific identification and is one of the plurality of the packets. Then the reorder unit is configured to insert the new identification allocated to the new packet instance into the data structure of ordered identifications next to the specific identification to maintain the sequence of the packet flow. The data structure of ordered identifications are used to transmit the plurality of packets and the new packet instance out of a port according to the sequence of the packet flow maintained in the data structure.

Aspects of the disclosure provide a network device that includes a plurality of network ports, a plurality of processing elements and a reorder unit. The plurality of network ports is configured to receive and transmit packets on a network. The plurality of processing elements are configured to process packets received from the ports. The reorder unit is configured to map identifications respectively allocated to a plurality of packets belonging to a packet flow having a sequence within a stream of packets into a data structure of ordered identifications to maintain a sequence of the packet flow, and allocate a new identification to a new packet instance generated during processing of a specific packet. The new packet instance is a portion of the specific packet or a replica of the specific packet, the specific packet has a specific identification and is one of the plurality of the packets. Further, the reorder unit is configured to insert the new identification allocated to the new packet instance into the data structure of ordered identifications next to the specific identification to maintain the sequence of the packet flow. The data structure of ordered identifications are used to transmit the plurality of packets and the new packet instance out of a port according to the sequence maintained in the data structure.

Aspects of the disclosure provide another method for packet processing. The method includes receiving a plurality of packets at a port of a network device, the plurality of packets belonging to a packet flow having a sequence within a stream of packets, mapping identifications respectively allocated to the plurality of packets into a data structure of ordered identifications to maintain the sequence of the packet flow, and generating one or more new packet instances during processing of a specific packet. The new packet instances are fragmented packets of the specific packet or replicas of the specific packet, and the specific packet has a specific identification and is one of the plurality of the packets. Further, the method includes queuing the new packet instances in a queue associated with the specific identification, marking a last new packet instance in the queue with release and other packets in the queue with no release, and transmitting packets from the network device according to the sequence of the packet flow maintained in the data structure and the queues associated with the identifications.

In an embodiment, to queue the new packet instances in the queue associated with the specific identification, the method includes queuing the new packet instance in a first-in-first-out queue associated with the specific identification.

According to an aspect of the disclosure, to transmit the packets from the network device according to the packet sequence maintained in the data structure and the queues associated with the identifications, the method includes maintaining the specific identification in the data structure before the last packet instance marked with release is transmitted, and removing the specific identification from the data structure when the last packet instance marked with release is transmitted from the network device.

In an embodiment, to transmit the plurality of packets and the new packet instance from the network device according to the packet sequence maintained in the data structure, the method includes transmitting the specific packet and the new packet instances from the network device without halting a packet processing element to check whether the specific identification is at a head position of the data structure. In another embodiment, the method includes finishing packet processing of the specific packet by a packet processing element without checking whether the specific identification for the specific packet is at a head position of the data structure.

Aspects of the disclosure provide a circuit that includes a plurality of ports configured to receive and transmit packets on a network, a plurality of packet processing elements configured to process packets received from the ports, and a reorder unit. The reorder unit is configured to map identifications respectively allocated to a plurality of packets belonging to a packet flow having a sequence within a stream of packets into a data structure of ordered identifications to maintain the sequence of the packet flow, associate a queue to a specific identification for a specific packet. One or more new packet instances are generated during processing of the specific packet, the new packet instances are fragmented packets of the specific packet or replicas of the specific packet, and are stored in the queue. A last new packet instance in the queue is marked with release and other packet instances in the queue are marked with no release, and packets are transmitted from the circuit according to the sequence maintained in the data structure and the queues associated with the identifications.

BRIEF DESCRIPTION OF THE DRAWINGS

Various embodiments of this disclosure that are proposed as examples will be described in detail with reference to the following figures, wherein like numerals reference like elements, and wherein:

FIG. 6 shows pseudo codes 600 according to an embodiment of the disclosure.

DETAILED DESCRIPTION OF EMBODIMENTS

Figure 1:
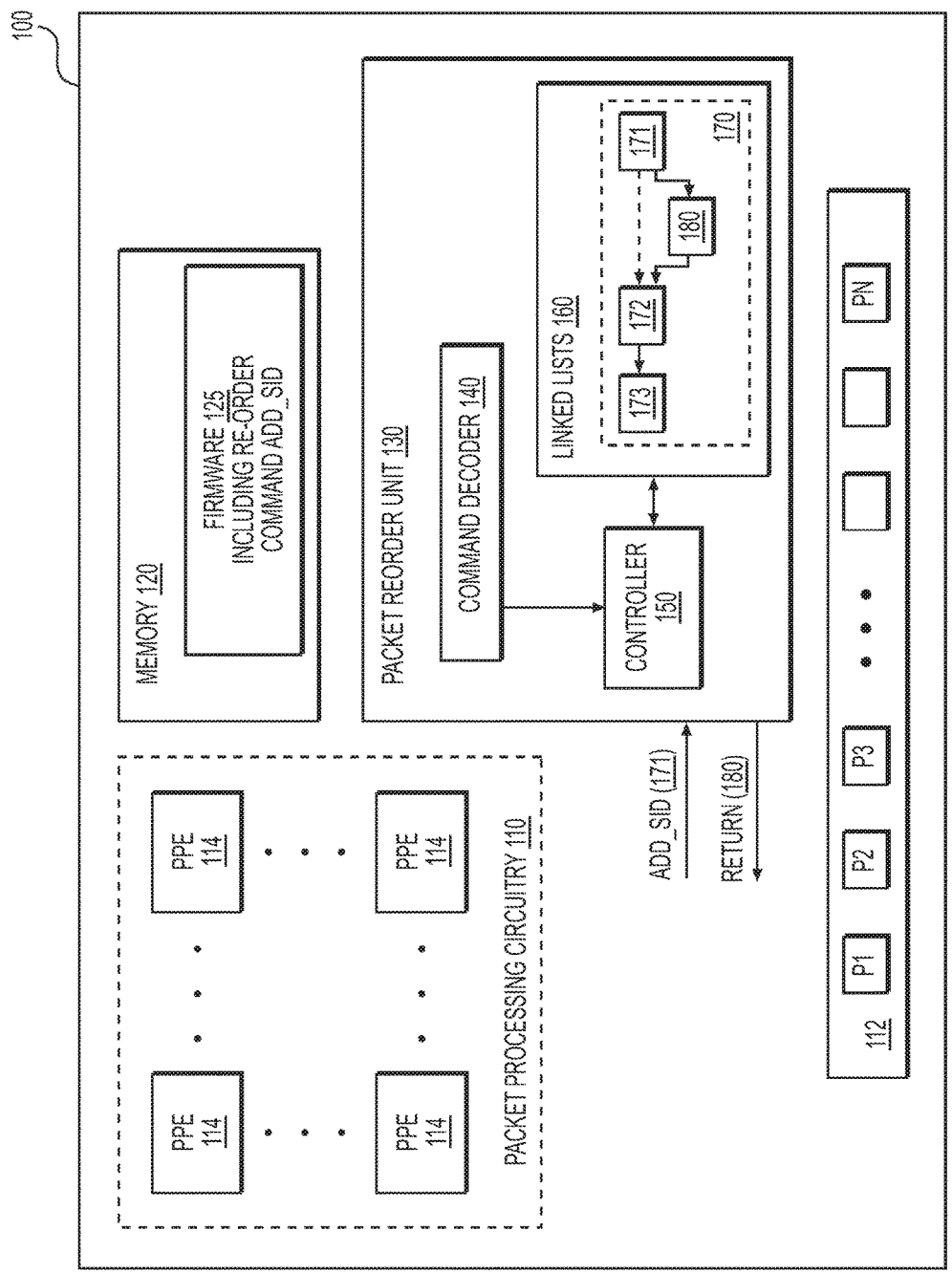
FIG. 1 shows a block diagram of a network device 100 according to an embodiment of the disclosure.

FIG. 1 shows a block diagram of a network device 100 according to an embodiment of the disclosure. The network device 100 uses a plurality of packet processing elements to improve packet processing bandwidth and uses linear data structures, such as queues, linked lists and the like, to manage and maintain packet orders in packet flows. In an example, the network device 100 is configured to insert new elements in the middle of the linear data structure in response to certain operations, such as a fragmentation operation, a multicasting operation and the like to maintain packet order within a packet flow.

Generally, a packet flow is referred to a sequence of packets of a same packet type originating from a same source and being sent to a same destination. A packet flow differs from a stream of packets, which are the packets received at a particular device and may include packets from one or more packet flows.

According to an aspect of the disclosure, the network device 100 is a suitable network device, such as a network switch, a bridge, a router, a VPN concentrator, and the like that connects two or more computer systems, network segments, subnets, and so on. It is noted that the network device 100 is not necessarily limited to a particular protocol layer or to a particular networking technology (e.g., Ethernet). In an example, the network device 100 is implemented on an integrated circuit (IC) chip using a system on a chip (SOC) technology. In another example, the network device 100 is implemented using multiple IC chips, and the multiple IC chips are coupled together in an IC package, by way of silicon interposers or on a printed circuit board (PCB) for example.

The network device 100 includes various functional circuit blocks, such as interface circuitry 112, packet processing circuitry 110, memory 120, a packet reorder unit 130, and the like coupled together for example using suitable interconnection architecture (not shown), such as a bus architecture. According to some embodiments of the disclosure, the packet reorder unit 130 is configured to use a linear data structure, such as queues, linked lists, and the like, to manage and maintain packet orders in packet flows, and is configured to add new elements in the middle of the data structure in response to certain operations, such as a fragmentation operation, a multicasting operation and the like to manage and maintain packet orders.

The interface circuitry 112 includes suitable circuits to form a plurality of network ports P1-PN. In an example, each of the plurality of network ports P1-PN is configured to couple another suitable network device in a communication network via a respective communication link. For example, when a network port is configured to be an ingress port, the network port receives packets coming into the network device 100 via a communication link; and when a network port is configured to be an egress port, the network port transmits packets out of the network device 100 via a communication link.

Generally speaking, the packet processing circuitry 110 is configured to process packets and to determine actions, such as sending a packet to a destination, encryption/decryption, fragmentation, multicasting, and the like on the packets. In the FIG. 1 example, the packet processing circuitry 110 includes a plurality of packet processing elements (PPEs) 114. The PPEs 114 are implemented using suitable technology. In an embodiment, the PPEs 114 are implemented using dedicated packet processing processors. In another embodiment, the PPEs 114 are implemented using programmable packet processing technology.

In an example, a PPE 114 is implemented using a general processing circuit unit (not shown), such as a processing core from Argonaut reduced instruction set computing (RISC) core (ARC) family, a processing core from advanced RISC machine family, a processing core from Tensilica, and the like, and wrapper circuitry (not shown) that interfaces the general processing circuit unit with circuitry specific for packet processing. The wrapper circuitry is configured to enable the general processing circuit unit to perform packet processing functions. In the example, the PPE 114 is configured to execute instructions (e.g., firmware) that are suitably programmed to perform packet processing.

In some embodiments, the PPEs 114 process packets themselves. In some embodiments, the PPEs 114 process packet descriptors associated with the packets rather than processing the packets themselves. A packet descriptor includes some information from the packet, such as some or all of the header information of the packet, and/or includes information generated for the packet by the network device 100, in an embodiment. In some embodiments, the packet descriptor includes other information as well such as an indicator of where the packet is stored in a memory associated with the network device 100. For ease of explanation, the term "packet" herein is used to refer to a packet itself or to a packet descriptor associated with the packet.

In some embodiments, the PPEs 114 are configured to operate in parallel, and process packets independently in a run to completion manner. In an example, each PPE 114 is configured to perform, with or without additional processing by dedicated accelerators (not seen) for some operations, all necessary processing operations (run to completion processing) of a packet. In operation, the network device 100 processes one or more data flows that traverse the network device 100. In an embodiment, a data flow corresponds to a sequence of packets of the same type (for instance a media packet or a VOID packet) received by the network device 100 via a certain ingress port (e.g., from a certain originating device) and destined for transmission via a certain egress port (e.g., to a certain target device coupled to the egress port), and, in some embodiments, a data flow is associated with one or more other parameters, such as a priority level relative to other data flows. Typically, order of packets in a data flow needs to be maintained through the network device 100 such that the order in which the packets are transmitted from the network device 100 is the same as the order in which the packets were received by the network device 100. However, because processing of packets in a data flow is distributed among multiple ones of the PPEs 114, in at least some situations the processing of the packets in a data flow is completed by the PPEs 114 in an order different than the order in which the packets were received by the network device 100. Out of order completion of processing of the packets is due, for example, to variance in latency encountered by different PPEs 114 when accessing other resources, such as accelerators, memory and like, for performing processing operations on a packet.

The memory 120 stores software instructions to be executed by components of the network device 100, such as the packet processing circuitry 110, the packet reorder unit 130 and the like and stores data to be processed. In the FIG. 1 example, the memory 120 stores reorder commands that cause the packet reorder unit 130 to perform packet reorder operations. One of the reorder commands is ADD_SID command. In an embodiment, the memory 120 includes non-volatile memory devices, such as read only memory (ROM), electrically programmable read only memory (EPROM), flash memory and the like to store firmware 125. The firmware 125 is executed by the PPEs 114 and the packet reorder unit 130 to perform packet processing. The firmware 125 includes reorder commands that are executed by the packet reorder unit 130. One of the reorder commands is ADD_SID command. The ADD_SID command is used when the network device 100 generates new packet instance during processing of a packet, such as a fragmentation operation of the packet, a multicast operation of the packet, and the like.

In an example, the ADD_SID command is sent from the firmware 125 to the packet reorder unit 130 in response to generation of a new packet instance for a fragmentation operation or a multicast operation and is executed by the packet reorder unit 130 to maintain packet order in a packet flow when the fragmentation operation or the multicast operation is performed on a packet in the packet flow.

The packet reorder unit 130 is configured to use certain linear data structures, such as queues, linked lists, and the like that are convenient to manage and maintain packet orders in packet flows and is configured to add new elements in the middle of the data structure in response to certain operations, such as a fragmentation operation, a multicasting operation and the like to maintain packet orders.

The packet reorder unit 130 is implemented using suitable technology. In an example, the packet reorder unit 130 is implemented using dedicated circuits. In another example, the packet reorder unit 130 is implemented using a general processing circuit unit that executes software instructions. In an embodiment, the packet reorder unit 130 is a portion of a queue management functional circuit block in the network device 100.

Specifically, in FIG. 1 example, the packet reorder unit 130 uses linked lists 160 to manage and maintain packet orders in packet flows although other suitable data structures may be used. In addition, in an example, the packet reorder unit 130 includes a command decoder 140 and a controller 150. In an embodiment, the controller 150 is implemented using a processor, and the command decoder 140 and other suitable circuits form wrapper circuitry to enable the processor to perform packet reorder functions. In an example, the packet reorder unit 130 receives commands for packet reorder operations, the command decoder 140 decodes the commands into binary strings that are executable by the processor, and the processor operates according to the binary strings to perform packet reorder operations.

According to an aspect of the disclosure, the packet reorder unit 130 allocates individual sequence identification (SID) for each packet instance, forms linked lists 160 of SIDs respectively corresponding to packet flows, and manages the linked lists 160 according to the received reorder commands. For example, the commands for packet reorder operations include a NEW command, a FINISH command, a BYPASS command, an UPDATE command, a PEEK command, and the ADD_SID command. It is noted that, in some examples, the commands carry suitable attribute values, such as a pointer to a packet, an identifier of a packet, an SID, and the like. It is also noted that, in some examples, the packet reorder unit 130 returns suitable values, such as an SID, a pointer, and the like, when the reorder commands are executed.

It is noted that the linked lists 160 are implemented using suitable linked list technique, such as singly linked list technique, forward linked list technique, backward linked list technique, doubly linked list technique, and the like.

In an example, when the network device 100 receives a packet, the packet reorder unit 130 receives the NEW command. In response to the NEW command, the packet reorder unit 130 allocates an SID, for example from a pool of available SIDs, to the packet to represent the packet, and adds the SID into a data structure representing a packet flow to map the packet in the packet flow. In an embodiment, the SID is first added, for example in a last element, of a data structure representing a default class of flow. It is noted that after a specific class of flow (specific packet flow) is identified based on the packet, the SID is added, for example in a last element, of a specific data structure representing the specific class of flow. In an embodiment, the data structure is a linked list. Each linked list is a linear collection of elements, and includes a plurality of linked elements linked in a line. For example, each element in the linked list includes a SID allocated to a packet and a pointer pointing to a next element in the linked list. The linked list generally has a head (first element in the linked list) and a tail (last element in the linked list). In an example, in response to the NEW command, the packet reorder unit 130 inserts a new element to be the last element in the linked list for the default class of flow, the new element includes the newly allocated SID.

In another example, when the network device 100 determines that a packet (allocated with an SID) belongs to a specific class of flow (specific packet flow), the packet reorder unit 130 receives the UPDATE command. In response to the UPDATE command, the packet reorder unit 130 removes an element (e.g., the first element) with the SID allocated to the packet from the linked list for the default class of flow, and inserts a new element to be the last element in a specific linked list for the specific class of flow (specific packet flow), the new element includes the SID allocated to the packet.

In another example, when a packet belonging to a packet flow is transmitted from the network device 100, the packet reorder unit 130 receives the FINISH command. In response to the FINISH command, the packet reorder unit 130 removes an element (e.g., the first element) with a SID allocated to the packet from the head of a linked list for the packet flow, and releases the SID that was allocated to the packet, such that the SID is in the available SID pool and is allocable to a newly received packet.

In another example, when the packet reorder unit 130 receives the PEEK command for a linked list, the packet reorder unit 130 returns the SID at the head (first element) of the linked list. In another example, when the packet reorder unit 130 receives the BYPASS command for a linked list, no operation is performed on the linked list.

According to an aspect of the disclosure, when a new packet instance is generated during processing of a specific packet, the packet reorder unit 130 receives the ADD_SID command. In an example, the ADD_SID command includes an attribute value, such as SID allocated to the specific packet (e.g., ADD_SID(171)). In response to the ADD_SID command, a SID (e.g., 180) from the available SID pool is allocated to the new packet instance, and the SID (e.g., 180) for the new packet instance is inserted into a linked list (170) at a position next to the SID (e.g., 171) that maps the original specific packet. Specifically, a new element is inserted at the position next to the element with the SID corresponding to the original specific packet. The new element includes the SID allocated to the new packet instance.

It is noted that, in an example, the SID is inserted into the linked list at a position before the SID corresponding to the original specific packet and in another example, the SID is inserted into the linked list at a position after the SID corresponding to the original specific packet. It is noted that any suitable linked list insertion algorithm can be used.

In an example, when a fragmentation operation is performed on a specific packet in a packet flow, a new packet instance that is a fragmented packet of the specific packet is generated, and the packet reorder unit 130 receives the ADD_SID command. In response to the ADD_SID command, a SID from the available SID pool is allocated to the new packet instance, and the SID for the new packet instance is inserted into a linked list at a position next to the SID corresponding to the original specific packet.

In an example, when a multicast operation is performed on a specific packet in a packet flow, a new packet instance that is a replica of the specific packet is generated, and the packet reorder unit 130 receives the ADD_SID command. In response to the ADD_SID command, a SID from the available SID pool is allocated to the new packet instance, and the SID for the new packet instance is inserted into a linked list at a position next to the SID corresponding to the original specific packet.

Further, according to an aspect of the disclosure, the linked lists 160 maintained by the packet reorder unit 130 are used to determine order of operations (e.g., transmitting out of the network device 100) on packets. In some embodiments, certain operations with respect to a packet in a packet flow are performed on the packet when the SID corresponding to the packet is at the head of the linked list for the packet flow. For example, transmitting a packet in a packet flow out of the network device 100 happens when the SID corresponding to the packet is at the head of the linked list for the packet flow. When the packet is transmitted out of the network device 100, the packet reorder unit 130 receives the FINISH command. In response to the FINISH command, in an example, the SID corresponding to the packet is removed from the head of the linked list, and is freed, and the next SID in the linked list becomes the head of the linked list.

According to an aspect of the disclosure, the operations of inserting SID corresponding to newly generated packet instance into a linked list for a packet flow during packet processing improves performance of the network device 100.

In a related example, the PEEK command is used to handle fragmentation or multicast in order to maintain packet orders. When a PPE 114 processes a packet of a packet flow for multicasting/fragmentation for example, the PEEK command is sent to the packet reorder unit 130 to poll a linked list for the packet flow and check whether the SID for the packet is at the head of the linked list. When the packet is at the head of the linked list, replicas/fragments are sent out of the network device 100 with BYPASS commands to bypass the packet reorder unit 130. The last replica is sent with the FINISH command that causes the packet reorder unit 130 to release the head of the linked list. However, when the packet is not at the head of the linked list, additional PEEK command is needed to keep polling the linked list. It is noted that the PEEK command holds a PPE 114 that processes the packet. The PEEK command based example overloads the network device 100 with PEEK transactions.

According to some embodiments of the present disclosure, when a PPE 114 processes a packet in a packet flow for multicasting/fragmentation for example, replicas/fragments are generated and SIDs corresponding to the replicas/fragments are inserted in the linked list, the replicas/fragments are ready for sending out similarly to the regular packets, thus PEEK command is not need. The PPE 114 for packet processing is releasable to process other packets and the network device 100 is not overloaded with the PEEK command. It is noted that when the replicas/fragments are generated and the SIDs corresponding to the replicas/fragments are inserted in the linked list representative of the packet flow, the replicas/fragments are processed similarly to the other packets, and no PEEK command is needed during processing and deadlock due to PEEK command can be avoided. Thus, in some embodiments, packets are sent between internal components of the network device 100 using BYPASS comments to bypass the packet reorder unit 130.

According to an aspect of the disclosure, the firmware 125 does not include the PEEK command that halts processing, thus the firmware 125 has shorter firmware cycle time.

Further, because there is no need to poll on the PEEK command, and thus interconnections (not shown) in the network device 100 are relieved of overloading due to polling of the PEEK command.

Figure 2:
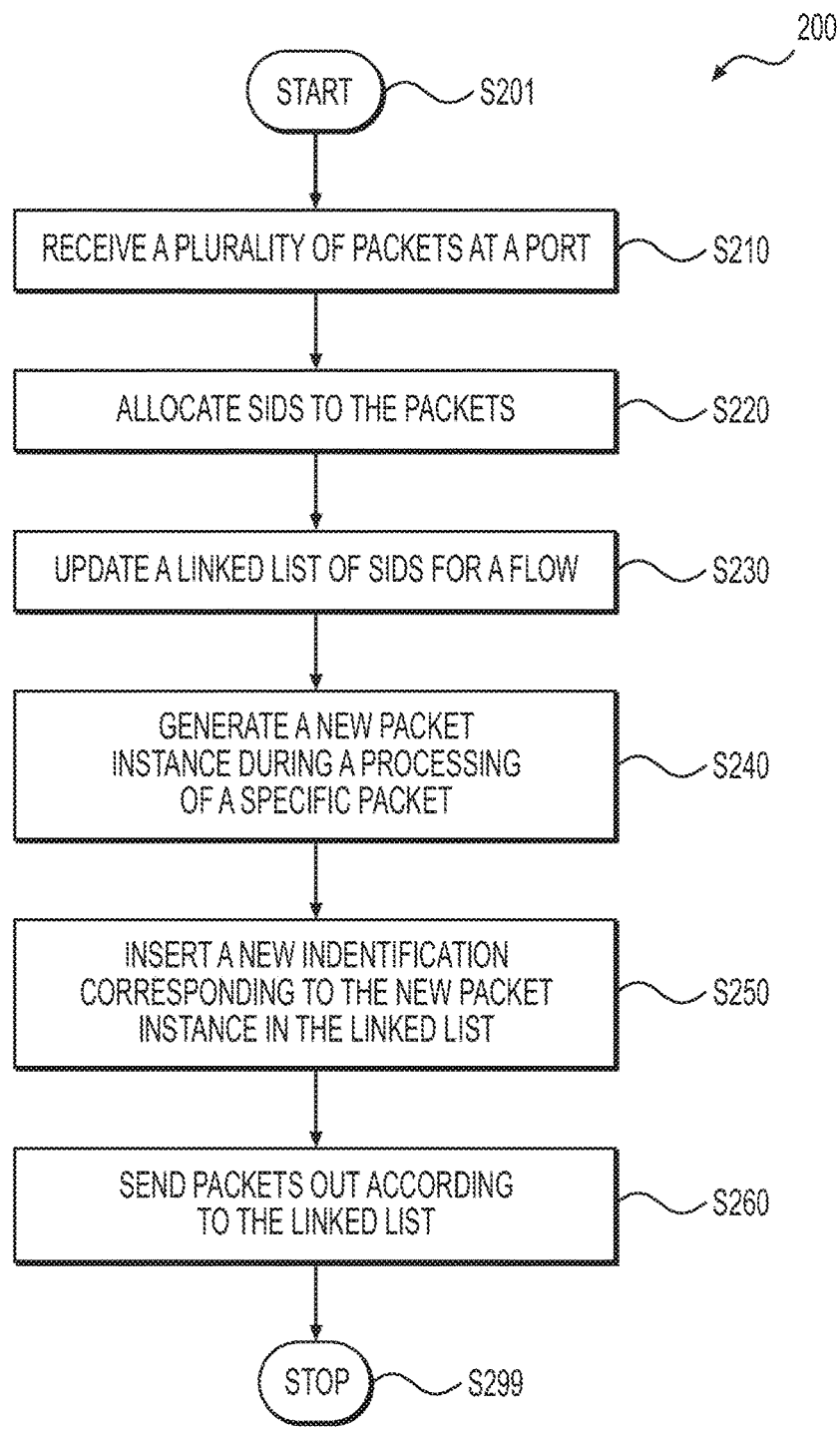
FIG. 2 shows a flow chart outlining a process example 200 executed by the network device 100 according to an embodiment of the disclosure.

FIG. 2 shows a flow chart outlining a process 200 according to an embodiment of the disclosure. In an example, the process 200 is executed by the network device 100 of FIG. 1. The process starts at S201 and proceeds to S210.

At S210, a plurality of packets are received at a port. In the FIG. 1 example, the network device 100 receives packets from ingress ports 112. For example, an ingress port, for example ingress port P1, is coupled to a packet source device that generates and sends a plurality of packets in a packet flow, and the ingress port P1 receives the plurality of packets in the packet flow.

At S220, SIDs are allocated to the packets. In the FIG. 1 example, when a packet enters the network device 100 from the ingress port P1, the packet reorder unit 130 receives a NEW command. In response to the NEW command, the packet reorder unit 130 allocates a SID from available SID pool to the packet to associate the SID with the packet, and the packet is mapped to the SID. Further, the packet reorder unit 130 inserts the SID in the last element (as tail) in a default linked list for a default class of flow.

At S230, linked lists are updated. In the FIG. 1 example, a packet flow (e.g., class of flow) for each packet is identified based on packet attributes. When a packet is determined to belong to a specific packet flow, the packet reorder unit 130 receives an UPDATE command. In response to the UPDATE command, the packet reorder unit 130 inserts the SID corresponding to the packet as the last element (tail) in a linked list for the specific packet flow.

At S240, a new packet instance is generated during processing of a specific packet. In the FIG. 1 example, the packet processing circuitry 110 processes one or multiple packets in parallel. In an example, the specific packet has a size larger than a threshold for transmitting to certain communication links, the PPE 114 processes the specific packet and fragments the specific packet into multiple fragments, thus generates one or more new packet instances. In another example, the specific packet is a multicast packet, the PPE 114 processes the specific packet, and generates one or more replicas, thus generates one or more new packet instances.

At S250, a new SID corresponding to a new packet instance is allocated and inserted into the linked list. In the FIG. 1 example, when a new packet instance for the specific packet is generated, the packet reorder unit 130 receives an ADD_SID command. In response to the ADD_SID command, the packet reorder unit 130 allocates a new SID from the available SID pool to the new packet instance, and inserts the new SID in a linked list for the packet flow to which the specific packet belongs. The new SID is inserted in the linked list at a position next to the SID for the specific packet. In an example, the new SID is inserted in the linked list at a position before the SID for the specific packet. In another example, the new SID is inserted in the linked list at a position after the SID for the specific packet.

At S260, packets are transmitted from the network device 100 according to the linked lists. In the FIG. 1 example, the linked lists 160 that are managed and maintained in the packet reorder unit 130 are used to control the order to send packets out of the network device 100. In an example, the network device 100 sends a packet out when the SID for the packet is at the head of a linked list. When the packet is transmitted from the network device 100, the packet reorder unit 130 receives a FINISH command. In an example, in response to the FINISH command, the packet reorder unit 130 removes the SID for the packet from the head of the linked list, thus the next SID after the removed SID becomes the head of the linked list. The removed SID is added into the available SID pool. The network device 100 further sends the packets according to the linked list. Then the process proceeds to S299 and terminates.

Figure 3A:
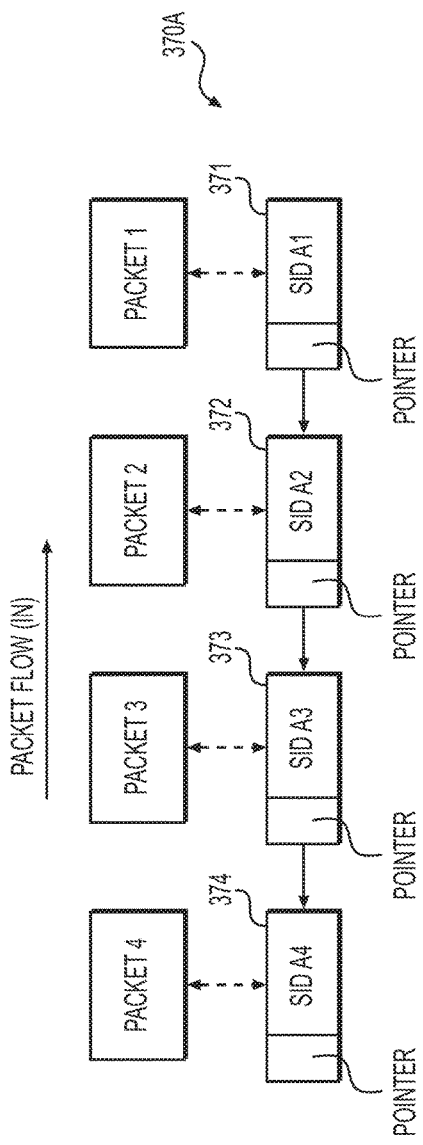
FIGS. 3A-3B show a fragmentation example of the network device 100 according to an embodiment of the disclosure.
Figure 3B:
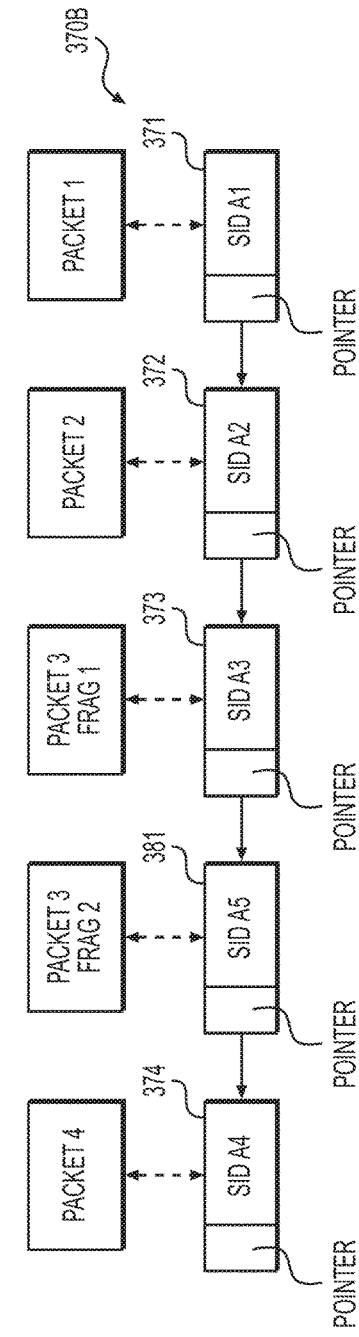

FIGS. 3A-3B show a fragmentation example according to an embodiment of the disclosure. FIG. 3A shows a packet flow (PACKET 1, PACKET 2, PACKET 3, PACKET 4 . . . ) coming into a network device, such as the network device 100. The network device 100 allocates SIDs to the packets and forms a linked list 370A of SIDs to map the packet flow.

Specifically, in an example, the network device 100 allocates SID A1 to PACKET 1, allocates SID A2 to PACKET 2, allocates SID A3 to PACKET 3, and allocates SID A4 to PACKET 4. Then the network device 100 forms the linked list 370A including elements 371-374. The element 371 is the head of the linked list, and includes the SID A1 and a pointer that points to the element 372. The element 372 includes the SID A2 and a pointer that points to the element 373. The element 373 includes the SID A3 and a pointer that points to the element 373. The element 374 includes the SID A4 and a pointer that points to a next element or a terminator of the linked list 370A.

In the example, PACKET 3 has a size larger than a threshold, and is fragmented into two packets for example FRAG 1 and FRAG 2. In the example, FRAG 1 is mapped to SID A3. Due to the new packet instance of FRAG 2, a new SID, such as SID A5 is allocated to the FRAG 2, and an element 381 is inserted into the linked list 370A next to 373, and the modified linked list is shown as linked list 370B in FIG. 3B. Thus, in the linked list 370B, the element 373 points to element 381. The element 381 includes the SID A5, and a pointer that points to the element 374.

Then, the linked list 370B is used to control the order to transmit packets from the network device 100.

Figure 4A:
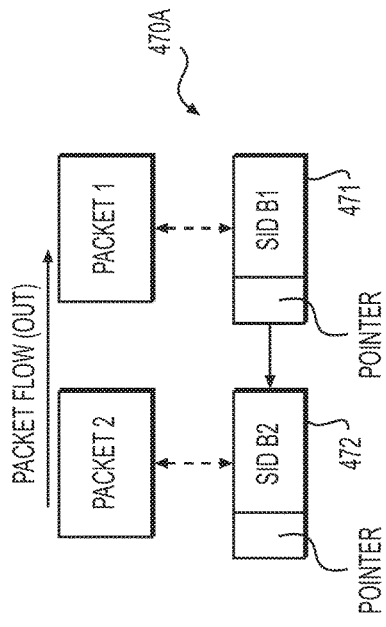
FIGS. 4A-4B show a multicast example of the network device 100 according to an embodiment of the disclosure.
Figure 4B:
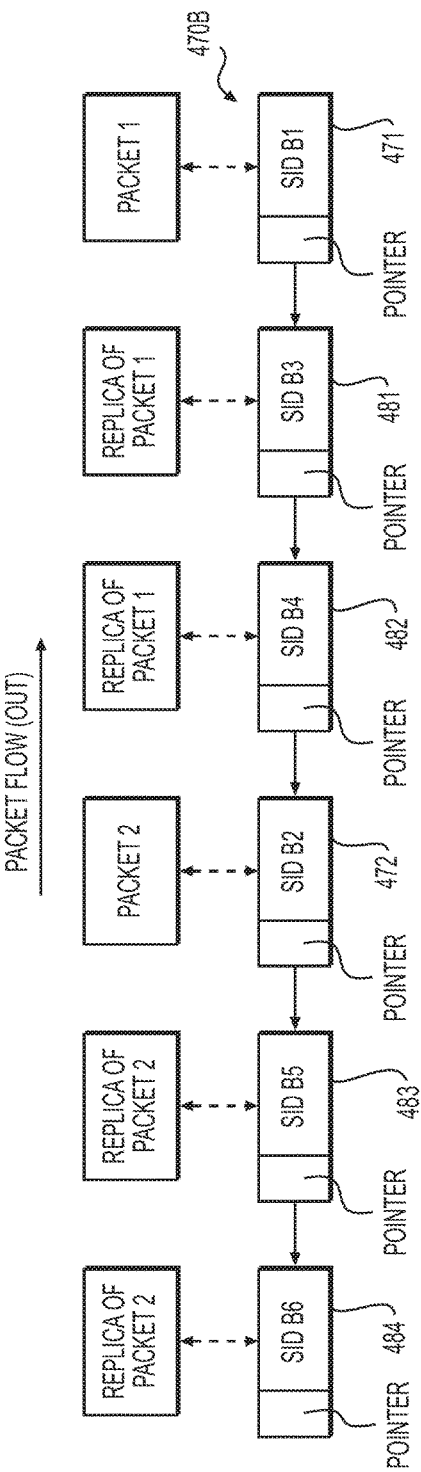

FIGS. 4A-4B show a multicast example according to an embodiment of the disclosure. FIG. 4A shows a packet flow (PACKET 1, PACKET 2 . . . ) coming into a network device, such as the network device 100. The network device 100 allocates SIDs to the packets and forms a linked list 470A of SIDs to map the packet flow.

Specifically, in an example, the network device 100 allocates SID B1 to PACKET 1, and allocates SID B2 to PACKET 2. Then the network device 100 foul's the linked list 470A including elements 471-472. The element 471 is the head of the linked list, and includes the SID B1 and a pointer that points to the element 472. The element 472 includes the SID B2 and a pointer that points to a next element or a terminator of the linked list.

In the example, the packet flow is a multicast packet flow, and each packet is sent out from three egress ports of the network device 100. In the example, two replicas are generated for each packet. Due to the new packet instances of replicas, new SID B3 is allocated to a first replica of PACKET 1, new SID B4 is allocated to a second replica of PACKET 1, and elements 481-482 are inserted into the linked list 470A next to element 471. Similarly new SID B5 is allocated to a first replica of PACKET 2, and new SID B6 is allocated to a second replica of PACKET 2, and elements 483-484 are inserted into the linked list 470A next to element 472. The modified linked list is shown as linked list 470B in FIG. 4B. Thus, in the linked list 470B, the pointer in the element 471 points to the element 481. The element 481 includes the SID B3, and a pointer that points to the element 482. The element 482 includes the SID B4, and a pointer that points to the element 472. The pointer in the element 472 points to the element 483. The element 483 includes the SID B5, and a pointer that points to the element 484. The element 484 includes the SID B6, and a pointer that points to a next element or a terminator of the linked list.

Then, the linked list 470B is used to control the order to send packets out of the network device 100.

According to another aspect of the disclosure. the network device 100 can associate queues with SIDs to let one SID to represent multiple packets, such as fragments, replicas, and the like.

Figure 5:
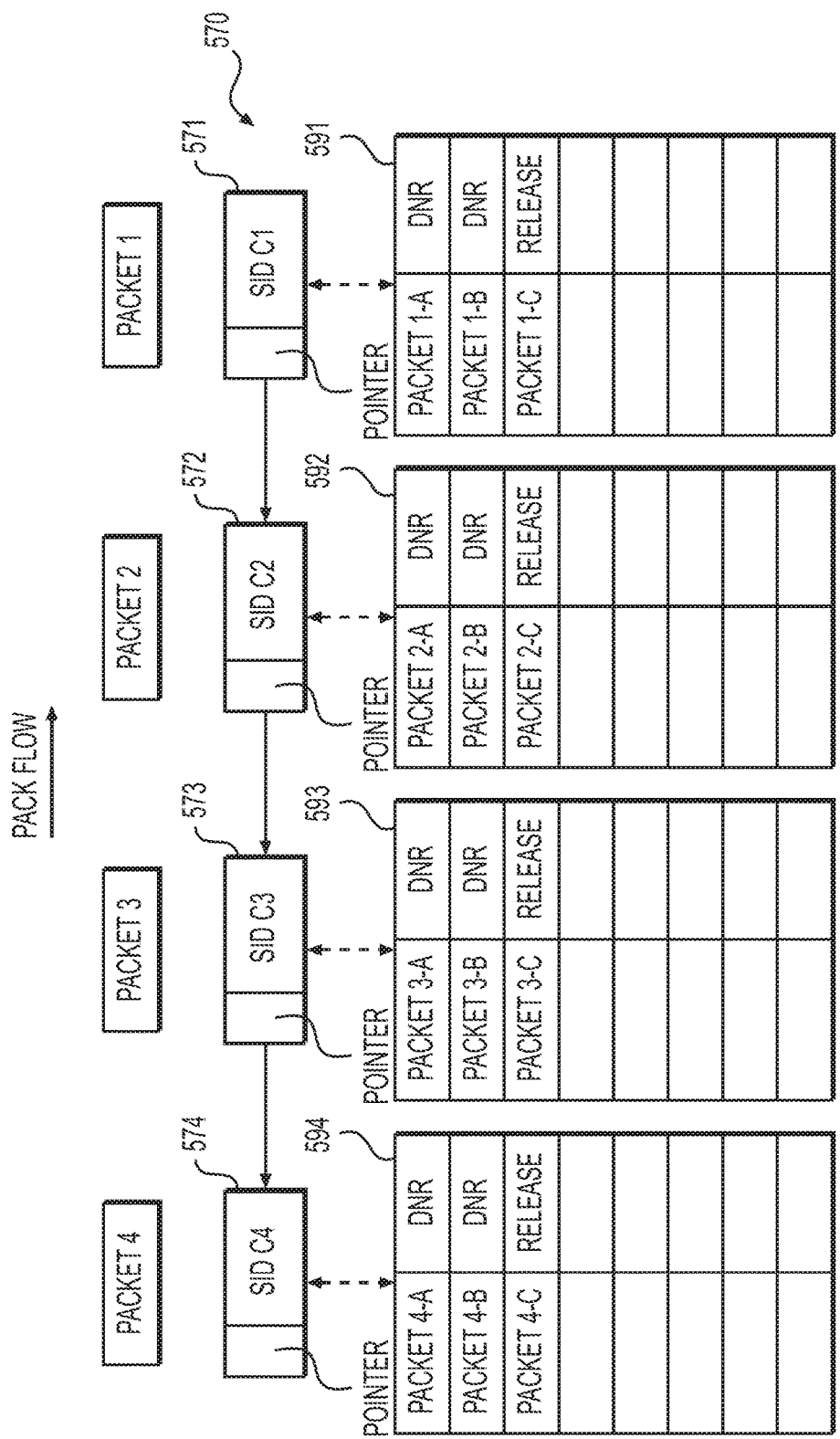
FIG. 5 shows a linked list example 570 in the network device 100 according to an embodiment of the disclosure.

FIG. 5 shows a linked list 570 according to an embodiment of the disclosure. In an example, the linked list 570 is used in the network device 100 in the place of the linked list 170.

In the FIG. 5 example, a packet flow (PACKET 1, PACKET 2, PACKET 3, PACKET 4 . . . ) comes into a network device, such as the network device 100. The network device 100 allocates SIDs to the packets and forms a linked list 570 of SIDs to map the packet flow.

Specifically, in an example, the network device 100 allocates SID C1 to PACKET 1, allocates SID C2 to PACKET 2, allocates SID C3 to PACKET 3, and allocates SID C4 to PACKET 4. Then the network device 100 forms the linked list 570 including elements 571-574. The element 571 is the head of the linked list 570, and includes the SID C1 and a pointer that points to the element 572. The element 572 includes the SID C2 and a pointer that points to the element 573. The element 573 includes the SID C3 and a pointer that points to the element 573. The element 574 includes the SID A4 and a pointer that points to a next element or a terminator of the linked list.

Additionally, for each allocated SID, a queue is formed and associated with the SID. In the example, a queue 591 is formed and associated with SID C1, a queue 592 is formed and associated with SID C2, a queue 593 is formed and associated with SID C3, and a queue 594 is formed and associated with SID C4. In an example, the queues are first in first out (FIFO) queues. Other suitable data structures can be used in the place of queues.

In a fragmentation example, a packet has a size larger than a threshold, and is fragmented, the fragments are queued in the queue associated with the SID allocated to the packet. For example, PACKET 1 is fragmented into PACKET 1-A, PACKET 1-B and PACKET 1-C, and the fragments are queued in the queue 591. The first two fragments PACKET 1-A, PACKET 1-B are marked with a do not release (DNR) (e.g., using a bit), and the last fragment PACKET 1-C is marked with release.

In a multicast example, the packet flow is a multicast packet flow, and each packet is sent out from three egress ports of the network device. In the example, replicas are generated for each packet. The original packet and the replicas are queued in the queue associated with the SID allocated to the packet. For example, PACKET 1-A is the original packet, PACKET 1-B and PACKET 1-C are replicas. The original packet and the replicas are queued in the queue 591. The original packet PACKET 1-A and the replica PACKET 1-B are marked with DNR, and the replica PACKET 1-C is marked with release.

During operation, when a SID reaches the head of the linked list, packets in the queue associated with the SID are transmitted in the order that the packets enter the queue. The SID remains in the head of the linked list until a packet marked with release is sent. When the packet marked with release is sent, the packet reorder unit 130 knows the last packet in the queue is sent, then the packet reorder unit 130 removes the SID from the head of the linked list, releases the SID and sends the SID back to the available SID pool in an example.

In an example, the queues associated with the SIDs queue the packets themselves. In another example, the queues associated with the SIDs queue pointers that point to the packets.

According to some embodiments of the disclosure, when a PPE 114 processes a packet in a packet flow for fragmentation/multicasting, fragments/replicas are generated and queued and are ready for sending out similarly to the regular packets, the PPE 114 for packet processing is released to process other packets and the network device 100 is not overloaded with the PEEK command. It is noted that no PEEK command is needed during processing and deadlock due to PEEK command can be avoided. Thus, in an embodiment, packets can be sent between internal components of the network device 100 using BYPASS comments to bypass the packet reorder unit 130. It is also noted that no need for extra SIDs in these embodiments.

FIG. 6 shows pseudo codes 600 that include the ADD_SID command according to an embodiment of the disclosure. In an example, a portion of the firmware 125 is implemented according to the pseudo codes 600, and executed in the network device 100 by various components of the network device 100.

In the FIG. 6 example, the pseudo codes 600 are used to duplicate packets, such as in a multicasting example. The pseudo codes 600 include a function (process_duplication_of_packets) to process and duplicate packets. The function includes pseudo codes 610-660.

Pseudo code 610 is a function to wait for an event to occur. In an example, the event is a packet duplication event.

Pseudo code 615 is a function to send a command to the queue management circuit block to receive a next packet (frame) as a packet for processing. In an example, packets received by an ingress port of the network device 100 are queued, SIDs are allocated to the packets and the SIDs are arranged in a listed list of SIDs that maps to a default class of flow.

Pseudo code 620 is a function to classify the packet (e.g., a classification to a specific data flow), update the packet information (e.g., update the SID of packet to a specific linked list that maps to the specific packet flow), and determine a number of duplications (e.g., num_of_duplications)

Pseudo code 625 is a loop command to repeat the pseudo codes 630-650 when the number of duplications is larger than one. In an example, the pseudo codes 630-650 are executed to process the packet and duplicate the packet.

Pseudo code 630 is a function to process the packet and update all the relevant fields, such as an egress port, and the like according to the packet processing.

Pseudo code 635 is a function to send a copy of the packet to the queue management circuit block to schedule the copy of packet for transmission from the network device 100 by the egress port.

Pseudo code 640 is the ADD_SID command. In an example, the ADD_SID command with a present SID allocated to the packet is sent to the packet recorder unit 130 to allocate a new SID for a new copy of the packet, and insert the new SID in the specific linked list next to the present SID. The packet reorder unit 130 returns the new SID.

Pseudo code 645 updates the present SID to be the new SID.

Pseudo code 650 reduces the number of duplication by one.

The loop that includes pseudo codes 630-650 repeats until the number of duplication is one.

Pseudo code 655 is out of the loop and is executed when the number of duplication is one. Pseudo code 655 is the function to process the packet and update all the relevant fields, such as an egress port, and the like according to the packet processing.

Pseudo code 660 is the function to send the packet to the queue management circuit block to schedule the packet for transmission from the network device 100 by the egress port.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for packet processing, comprising:
receiving a plurality of packets at a port of a network device, the plurality of packets belonging to a packet flow having a sequence within a stream of packets;
mapping identifications respectively allocated to the plurality of packets into a data structure of ordered identifications to maintain the sequence of the packet flow;
generating a new packet instance during processing of a specific packet, the new packet instance being a portion of the specific packet or a replica of the specific packet, the specific packet having a specific identification and being one of the plurality of the packets;
inserting a new identification allocated to the new packet instance into the data structure of ordered identifications next to the specific identification to maintain the sequence of the packet flow; and
transmitting the plurality of packets and the new packet instance belonging to the packet flow from the network device according to the sequence maintained in the data structure.

2. The method of claim 1, wherein mapping the identifications respectively allocated to the plurality of packets into the data structure of ordered identifications to maintain the sequence of the packet flow further comprises:
mapping the identifications respectively allocated to the plurality of packets into a linked list of ordered identifications to maintain the sequence of the packet flow.

3. The method of claim 1, wherein generating the new packet instance during processing of the specific packet further comprises:
generating the new packet instance that is the replica of the specific packet in response to a multicast of the specific packet.

4. The method of claim 1, wherein generating the new packet instance during processing of the specific packet further comprises:
generating the new packet instance that is a fragment packet of the specific packet when a size of the specific packet is larger than a threshold.

5. The method of claim 1, wherein inserting the new identification allocated to the new packet instance into the data structure of ordered identifications next to the specific identification to maintain the sequence of the packet flow further comprises:
inserting the identification allocated to the new packet instance into the data structure of ordered identifications after the specific identification for the specific packet.

6. The method of claim 1, wherein inserting the new identification allocated to the new packet instance into the data structure of ordered identifications next to the specific identification to maintain the sequence of the packet flow further comprises:
inserting the identification allocated to the new packet into the data structure of ordered identifications before the specific identification for the specific packet.

7. The method of claim 1, further comprising:
distributing the packets among two or more packet processing elements for a run-to-complete type of packet processing.

8. The method of claim 1, wherein transmitting the plurality of packets and the new packet instance from the network device according to the sequence maintained in the data structure further comprises:
transmitting the specific packet and the new packet instance out the network device without halting a packet processing element to check whether the specific identification is at a head position of the data structure.

9. The method of claim 1, further comprising:
finishing packet processing of the specific packet by a packet processing element without checking whether the specific identification for the specific packet is at a head position of the data structure.

10. A circuit for processing data packets on a network, comprising:
a plurality of ports configured to receive and transmit packets on a network;
a plurality of packet processing elements configured to process packets received from the ports; and
a reorder unit configured to:
map identifications respectively allocated to a plurality of packets belonging to a packet flow having a sequence within a stream of packets into a data structure of ordered identifications to maintain the sequence of the packet flow;
allocate a new identification to a new packet instance generated during processing of a specific packet, the new packet instance being a portion of the specific packet or a replica of the specific packet, the specific packet having a specific identification and being one of the plurality of the packets; and
insert the new identification allocated to the new packet instance into the data structure of ordered identifications next to the specific identification to maintain the sequence of the packet flow;
wherein the data structure of ordered identifications are used to transmit the plurality of packets and the new packet instance out of a port according to the sequence maintained in the data structure.

11. The circuit of claim 10, wherein the reorder unit is configured to map the identifications respectively allocated to the plurality of packets into a linked list of ordered identifications to maintain the sequence of the packet flow.

12. The circuit of claim 10, wherein one of the processing elements is configured to generate the new packet instance that is the replica of the specific packet in response to a multicast of the specific packet.

13. The circuit of claim 10, wherein one of the processing elements is configured to generate the new packet instance that is a fragment packet of the specific packet when a size of the specific packet is larger than a threshold.

14. The circuit of claim 10, wherein the reorder unit is configured to insert the identification allocated to the new packet instance into the data structure of ordered identifications after the specific identification for the specific packet.

15. The circuit of claim 10, wherein the reorder unit is configured to insert the identification allocated to the new packet into the data structure of ordered identifications before the specific identification for the specific packet.

16. The circuit of claim 10, wherein:
a packet processing element is configured to process the specific packet and generate the new packet instance without checking whether the specific identification for the specific packet is at a head position of the data structure.

17. The circuit of claim 16, wherein:
the specific packet and the new packet instance are transmitted out the circuit without halting the packet processing element to check whether the specific identification for the specific packet is at the head position of the data structure.

18. The circuit of claim 16, wherein:
the packet processing element is configured to finish processing of the specific packet without checking whether the specific identification is at the head position of the data structure.

19. A network device, comprising:
a plurality of network ports configured to receive and transmit packets on a network;
a plurality of processing elements configured to process packets received from the ports; and
a reorder unit configured to:
map identifications respectively allocated to a plurality of packets belonging to a packet flow having a sequence within a stream of packets into a data structure of ordered identifications to maintain the sequence of the packet flow;
allocate a new identification to a new packet instance generated during processing of a specific packet, the new packet instance being a portion of the specific packet or a replica of the specific packet, the specific packet having a specific identification and being one of the plurality of the packets; and
insert the new identification allocated to the new packet instance into the data structure of ordered identifications next to the specific identification to maintain the sequence of the packet flow;
wherein the data structure of ordered identifications are used to transmit the plurality of packets and the new packet instance out of a port according to the sequence maintained in the data structure.

20. The network device of claim 19, wherein the reorder unit is configured to map the identifications respectively allocated to the plurality of packets into a linked list of ordered identifications to maintain the sequence of the packet flow.

* * * * *